United States Patent
Venkatakrishnan et al.

(10) Patent No.: US 10,833,724 B1
(45) Date of Patent: Nov. 10, 2020

(54) FEED NETWORKS FOR SELF-INTERFERENCE CANCELLATION

(71) Applicants: Satheesh Bojja Venkatakrishnan, Miami, FL (US); John L. Volakis, Coral Gables, FL (US)

(72) Inventors: Satheesh Bojja Venkatakrishnan, Miami, FL (US); John L. Volakis, Coral Gables, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 16/849,166

(22) Filed: Apr. 15, 2020

Related U.S. Application Data

(60) Provisional application No. 62/834,709, filed on Apr. 16, 2019.

(51) Int. Cl.
*H04B 1/56* (2006.01)
*H04B 1/10* (2006.01)
*H04B 1/04* (2006.01)
*H04L 25/02* (2006.01)

(52) U.S. Cl.
CPC ............ *H04B 1/56* (2013.01); *H04B 1/0475* (2013.01); *H04B 1/109* (2013.01); *H04L 25/0278* (2013.01)

(58) Field of Classification Search
CPC combination set(s) only.
See application file for complete search history.

(56) References Cited

U.S. PATENT DOCUMENTS

| 5,129,099 A | * | 7/1992 | Roberts | G01S 7/03 333/1.1 |
| 5,212,813 A | * | 5/1993 | Renaud | H01P 1/213 343/858 |
| 5,815,803 A | * | 9/1998 | Ho | H04B 1/525 333/1.1 |
| 5,963,587 A | * | 10/1999 | Kumagai | H04B 1/50 375/219 |
| 9,246,524 B2 | * | 1/2016 | Nealis | H04B 1/0475 |

* cited by examiner

*Primary Examiner* — Junpeng Chen
(74) *Attorney, Agent, or Firm* — Saliwanchik, Lloyd & Eisenschenk

(57) ABSTRACT

Feed networks and methods of using the same to achieve high levels of self-interference cancellation (SIC) in Simultaneous Transmit and Receive (STAR) systems are provided. SIC at the antenna feed network alone can be as high as 100 dB. This can be done by employing entirely low-cost, low-profile passive circuits. The feed network creates a perfect anti-phase path that cancels the high power self-interference signal at the receive port.

20 Claims, 8 Drawing Sheets

FEED NETWORKS FOR SELF-INTERFERENCE CANCELLATION

CROSS-REFERENCE TO A RELATED APPLICATION

This application claims the benefit of U.S. Provisional Application Ser. No. 62/834,709, filed Apr. 16, 2019, which is hereby incorporated by reference herein in its entirety, including any figures, tables, and drawings.

BACKGROUND

Due to increased consumer demand, more frequency bands (such as discontinuous frequency bands) are expected to be allocated for commercial use (e.g. Advanced Wireless Service spectrum auction; AWS-3). As a result, only a small percentage of the radio frequency (RF) spectrum is expected to be assigned for future wireless communication systems, which require much higher data rates. This highly fragmented and congested spectrum will become more vulnerable to unintentional RF jamming and intentional malicious interference.

A technique for increasing spectral efficiency is the approach of Simultaneous Transmit and Receive (STAR) within the same frequency band. STAR offers the advantage of using the same frequency band for transmission and reception at the same time, which therefore leads to doubling throughput via a method referred to as in-band full duplexing. A primary challenge in realizing STAR systems is the strong self-interference from the transmitter in such systems. Typically, the leaked signal includes that from the transmitter and a portion of the reflected waves. Also, harmonics from the power amplifier (PA) and noise from the transmit chain contribute to interference in the receiver. As a result, the receiver's performance is degraded, and reliable reception can even be affected without self-interference cancellation (SIC) techniques. Implementation of STAR requires significant isolation from 90 dB to 120 dB between the transmit and receive signals.

Advancements in digital hardware and processing capabilities make wideband operations within our reach. Nevertheless, the lack of a contiguous spectrum makes the design of such wideband system even more challenging. Indeed, the need for more bandwidth has led to the development of creative approaches for spectrum allocation and reuse. Along these lines, STAR schemes employing the same frequency for both transmission and reception have been proposed.

STAR systems have the potential to double spectral efficiency and enhance spectrum utilization within the traditional microwave bands. A primary challenge in realizing STAR systems is their strong self-interference from the transmitter. That is, the transmitted signal leaks into the nearby receiver (that may share the same or a nearby antenna aperture) causing high levels of interference. Typically, the leaked signal includes direct and reflected signals, which contain the data signal, as well as harmonics from PAs and noise from the transmit chain. As a result, the receiver's performance is degraded and reliable reception can be affected without SIC techniques. Direct signal suppression can be carried out in the propagation domain, RF analog domain, analog baseband, and digital domain.

BRIEF SUMMARY

Embodiments of the subject invention provide novel and advantageous systems, feed networks, and methods of using the same to achieve high levels of self-interference cancellation (SIC), for example in Simultaneous Transmit and Receive (STAR) systems. Systems and methods of embodiments of the subject invention can reach as high as 100 decibel (dB) SIC at the antenna feed network alone. This can advantageously be done by employing entirely low-cost, low-profile passive circuits. The novel feed networks create a perfect (or near-perfect) anti-phase path that cancels the high power self-interference signal at the receive port. The feed networks can be easily integrated in any existing transceiver, and can cancel all self-interference components, including direct transmit signal, harmonics from the power amplifiers (PAs), and noise from the transmit chain.

In an embodiment, a feed network to enhance SIC can comprise: a first circulator; a second circulator connected to the first circulator; a third circulator connected to the first circulator; a hybrid-180° coupler connected between the first circulator and the third circulator; and a ferrite isolator connected between the first circulator and the second circulator. The third circulator and/or the hybrid-180° coupler can be connected to ground. The first circulator can be configured to receive an input (e.g., from a radio transceiver) to the feed network; the hybrid-180° coupler can be configured to send an output (e.g., to a radio transceiver) from the feed network; and/or the second circulator can be configured to receive an input (e.g., from an antenna) to the feed network and send an output (e.g., to the antenna) from the feed network. In a further embodiment, a STAR system can comprise: an antenna; a radio transceiver; and a feed network as described herein connected between the antenna and the radio transceiver. The STAR system can further comprise an antenna impedance tuner connected between the feed network and the antenna.

In another embodiment, a feed network to enhance SIC can comprise: a first circulator; a first hybrid-180° coupler connected to the first circulator; a second circulator connected to the first hybrid-180° coupler; a third circulator connected to the first circulator; a second hybrid-180° coupler connected between the fourth circulator and the third circulator; a third hybrid-180° coupler connected between the second hybrid-180° and the second circulator; a fourth circulator connected to the first hybrid-180° coupler and the second hybrid-180° coupler; and a ferrite isolator connected between the first hybrid-180° coupler and the second circulator. The feed network can further comprise: a first attenuator connected between the first circulator and the third circulator; a second attenuator connected between the first hybrid-180° coupler and the fourth circulator; and/or a tunable external multi-tap matching network connected to the fourth circulator. One of the ports of the third circulator can be terminated with 50Ω load; the sigma port of the first hybrid-180° coupler can be terminated with 50Ω load; the delta port of the second hybrid-180° coupler can be terminated with 50Ω load; and the delta port of the third hybrid-180° coupler can be terminated with 50Ω load. The first circulator can be configured to receive an input (e.g., from a radio transmit chain) to the feed network; the third hybrid-180° coupler can be configured to send an output (e.g., to a radio transceiver) from the feed network; and/or the second circulator can be configured to receive an input (e.g., from an antenna) to the feed network and send an output (e.g., to the antenna) In a further embodiment, a STAR system can comprise: an antenna; a radio transceiver; and a feed network as described herein connected between the antenna and the radio transceiver. The STAR system can further comprise an antenna impedance tuner connected between the feed network and the antenna.

DETAILED DESCRIPTION

Embodiments of the subject invention provide novel and advantageous systems, feed networks, and methods of using the same to achieve high levels of self-interference cancellation (SIC), for example in Simultaneous Transmit and Receive (STAR) systems. Systems and methods of embodiments of the subject invention can reach as high as 100 decibel (dB) SIC at the antenna feed network alone. This can advantageously be done by employing entirely low-cost, low-profile passive circuits. The novel feed networks create a perfect (or near-perfect) anti-phase path that cancels the high power self-interference signal at the receive port. The feed networks can be easily integrated in any existing transceiver, and can cancel all self-interference components, including direct transmit signal, harmonics from the power amplifiers (PAs), and noise from the transmit chain.

In contrast to direct signal suppression, indirect or reflected signal cancellation is much more challenging and complex as it varies with time and the environment. Signal cancellation in the propagation domain can be accomplished by exploiting antenna cross-polarization (for example, the transmit and receive signals have different polarization), beam-forming, or circulators for shared-antenna systems. Cancellation in the analog domain is done at the radio frequency (RF) stage and baseband stages. Cancellation in the digital domain involves probabilistic modeling of the propagation channel and additional hardware placed between the analog to digital converter (ADCs) and digital to analog converters (DACs). Thus, an SIC architecture should be able to model and predict (and therefore negate) these distortions at all three domains to achieve full duplex operation. Notably, to prevent or inhibit receiver saturation, it is crucial to sufficiently cancel the interfering signal at the antenna stage, prior to reaching the RF and baseband stages.

Figure 2:
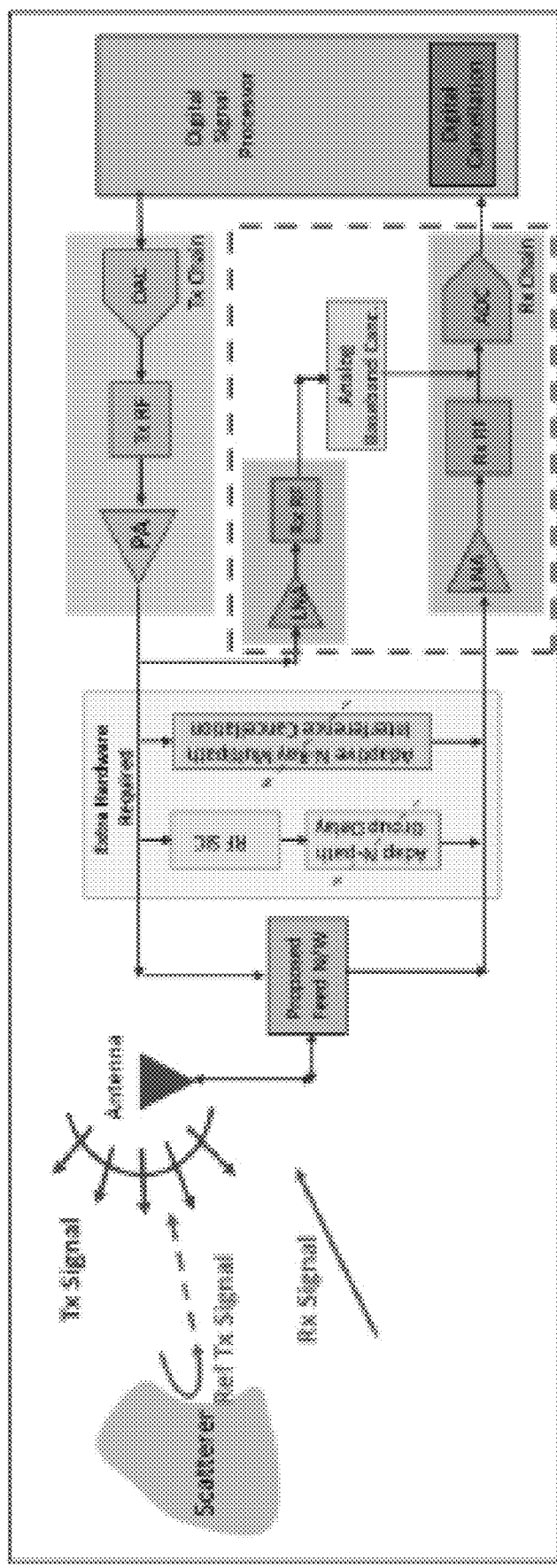
FIG. 2 is a schematic view of a Simultaneous Transmit and Receive (STAR) architecture according to an embodiment of the subject invention.
Figure 3:
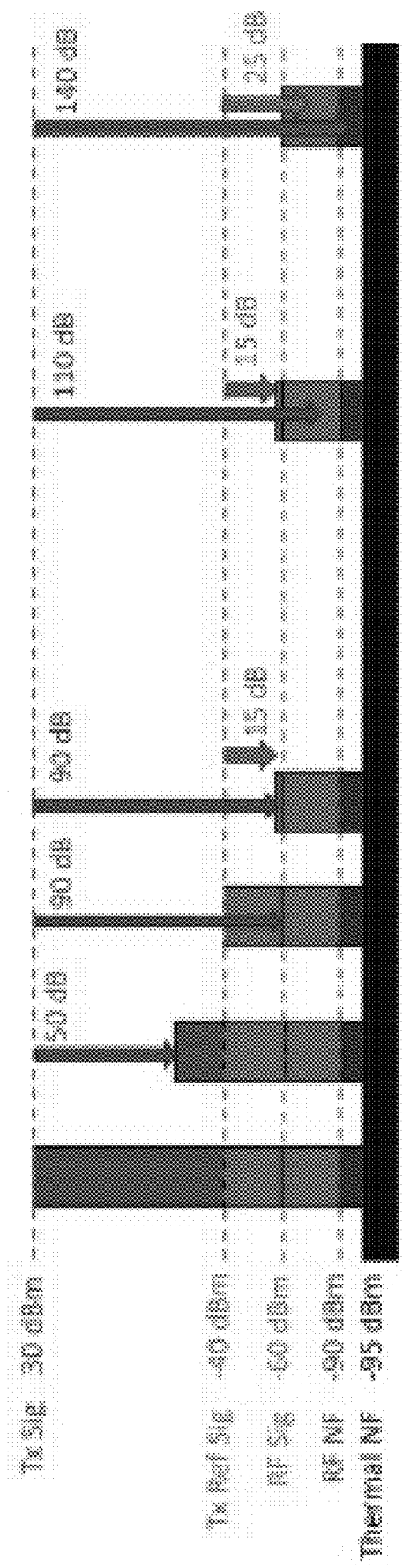
FIG. 3 is a depiction of power management of full duplex radios for wideband performance (more than 1 GHz in contiguous bandwidth cancellation), according to an embodiment of the subject invention.

FIG. 2 is a schematic view of a Simultaneous Transmit and Receive (STAR) architecture according to an embodiment of the subject invention. Referring to FIG. 2, the novel feed network can suppress high power transmit signals in the RF domain by creating a perfect out of phase (180°) path at the receive port. Doing so, the sampled signal(s) at the transmit chain is modified and subtracted using 180° hybrid coupler(s) and/or balun(s). This novel approach has many technical benefits, including: 1) its simple integration into any existing radio irrespective of antenna type; 2) the ability to suppress all signal components from the transmit chain including high power direct transmit signal, harmonics from PAs, and noise from the transmit chain; and 3) low cost and low size, weight, area and power (SWaP-C) implementation due to being completely passive without added power consumption (and hence being referred to as a "ubiquitous" feed network). This completely passive small volume can be integrated into any existing STAR radio (system on chip or system in package), e.g., for future 5G technologies and other applications in commercial and military communication, radar, and remote sensing. FIG. 3 shows example power management of full duplex radios for wideband performance (more than 1 gigahertz (GHz) in contiguous bandwidth cancellation).

Figure 1:
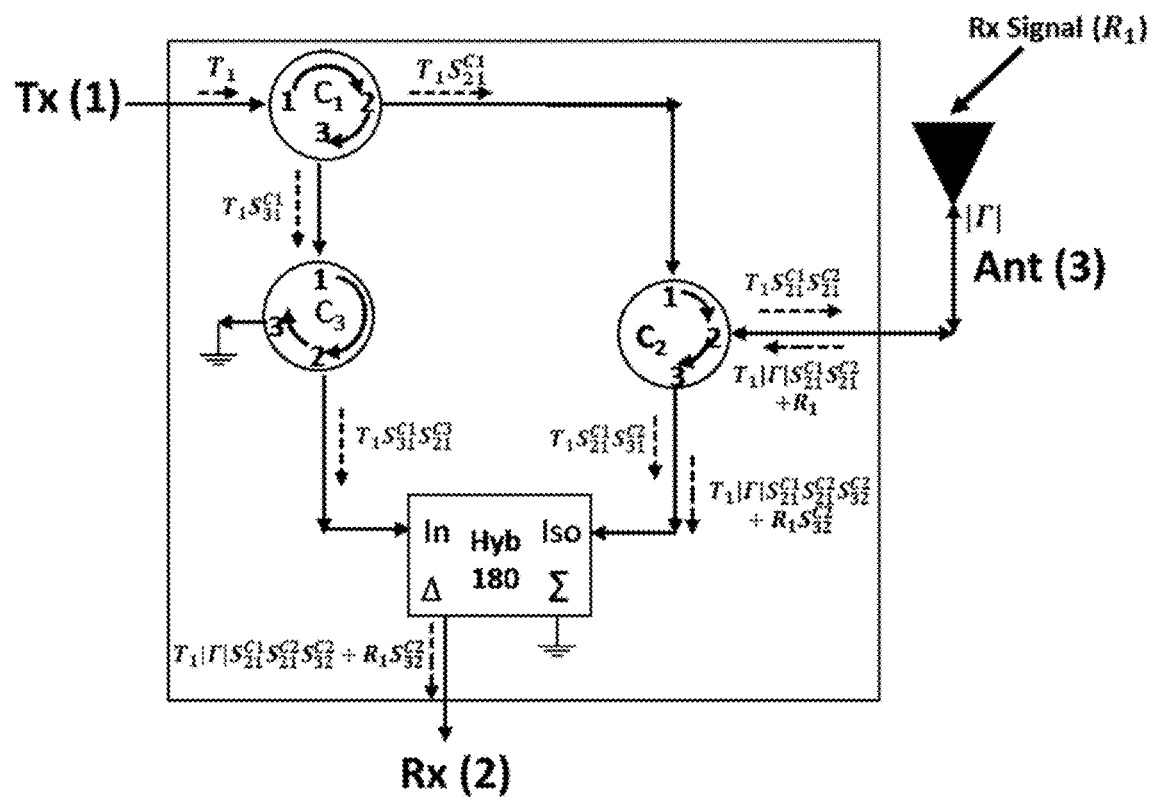
FIG. 1 is a schematic view of a feed network representation.
Figure 4A:
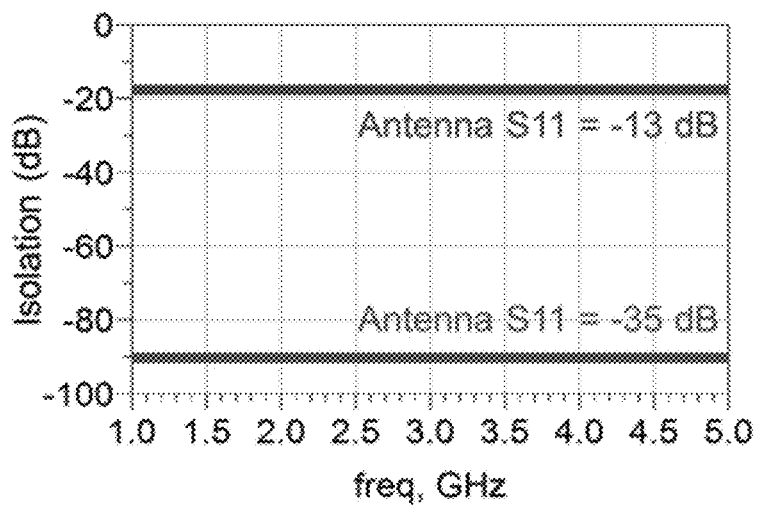
FIG. 4(a) is a plot of simulation isolation (in decibels (dB)) achieved versus frequency (in gigahertz (GHz)).
Figure 4B:
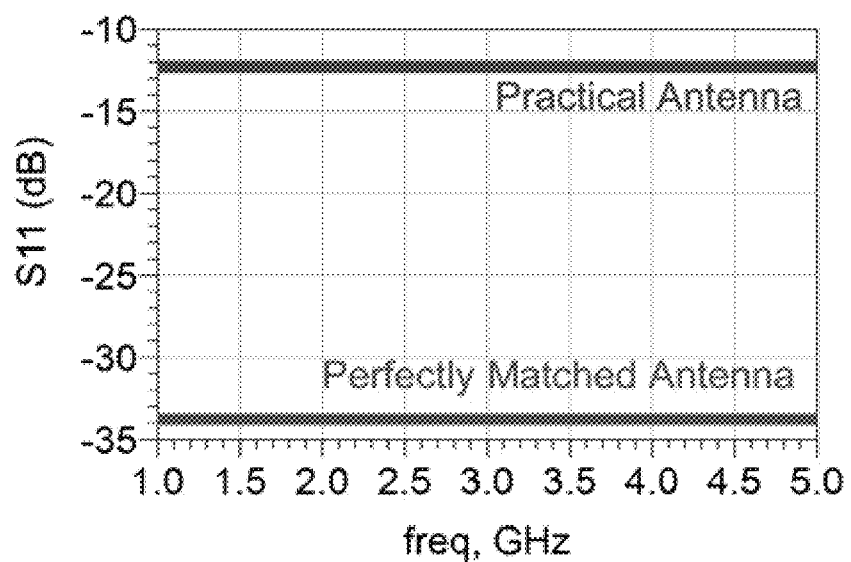
FIG. 4(b) is a plot of antenna return loss (in dB) achieved versus frequency (in GHz).

FIG. 1 is a schematic view of a feed network representation from U.S. Pat. No. 5,815,803, which is hereby incorporated by reference in its entirety. The feed network of FIG. 1 provides for a STAR cancellation of 50 dB (see FIG. 2 in U.S. Pat. No. 5,815,803). However, the feed network in U.S. Pat. No. 5,815,803 suffers from a major drawback. Specifically, it requires the antenna to be "perfectly" matched, in that it requires that $\Gamma=[(Z_{ant}-Z_0)/(Z_{ant}+Z_o)]=0$ (see FIG. 2 in U.S. Pat. No. 5,815,803). Referring to FIG. 4(a), using the feed network proposed in U.S. Pat. No. 5,815,803 (upper plot line in FIG. 4(a)) the achieved STAR cancellation is only 20 dB when antenna return loss (S11) is −13 dB (see FIG. 4(b)). As the antenna return loss improves to −35 dB, the corresponding cancellation improves to almost 90 dB (lower plot line in FIGS. 4(b) and 4(a), respectively).

Figure 5:
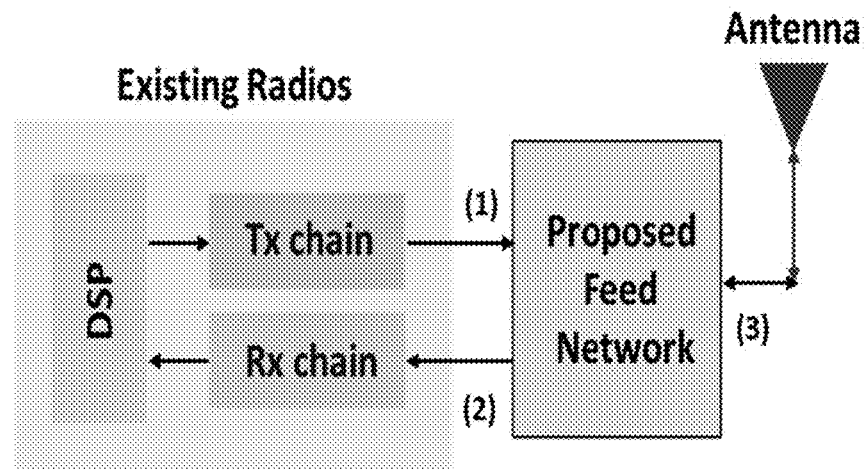
FIG. 5 is a pictorial representation of inclusion of a feed network of an embodiment of the subject invention ("proposed feed network" as labeled in the figure) with existing radio hardware, according to an embodiment of the subject invention.

Embodiments of the subject invention do not need to rely on antenna matching requirements, allowing for practical realization of high STAR cancellation at the antenna stage. Embodiments include a narrowband approach and a wideband approach for STAR at the antenna stage. In both approaches, the only hardware that is necessary to be added to the existing radio is the feed network interconnected between the transceiver RF output and the antenna input, as depicted in FIG. 5, in which the box labeled "proposed feed network" represents a feed network according to an embodiment of the subject invention.

Narrowband Approach

The feed network in U.S. Pat. No. 5,815,803 provides good STAR cancellation provided the antenna is perfectly matched (i.e., $|\Gamma|=0$). Under this condition, the reflected signal $T_1$ (see FIG. 2) vanishes, and it is only necessary to remove signal components from the transmitter circuits.

To achieve strong STAR cancellation even when the antenna is mismatched, embodiments of the subject invention can include a narrowband tunable antenna impedance matching network to limit the reflected signal power. In addition, a mono-directional filter can be added (as shown in FIG. 6) to suppress wave propagation back to the circulator C1.

Figure 6:
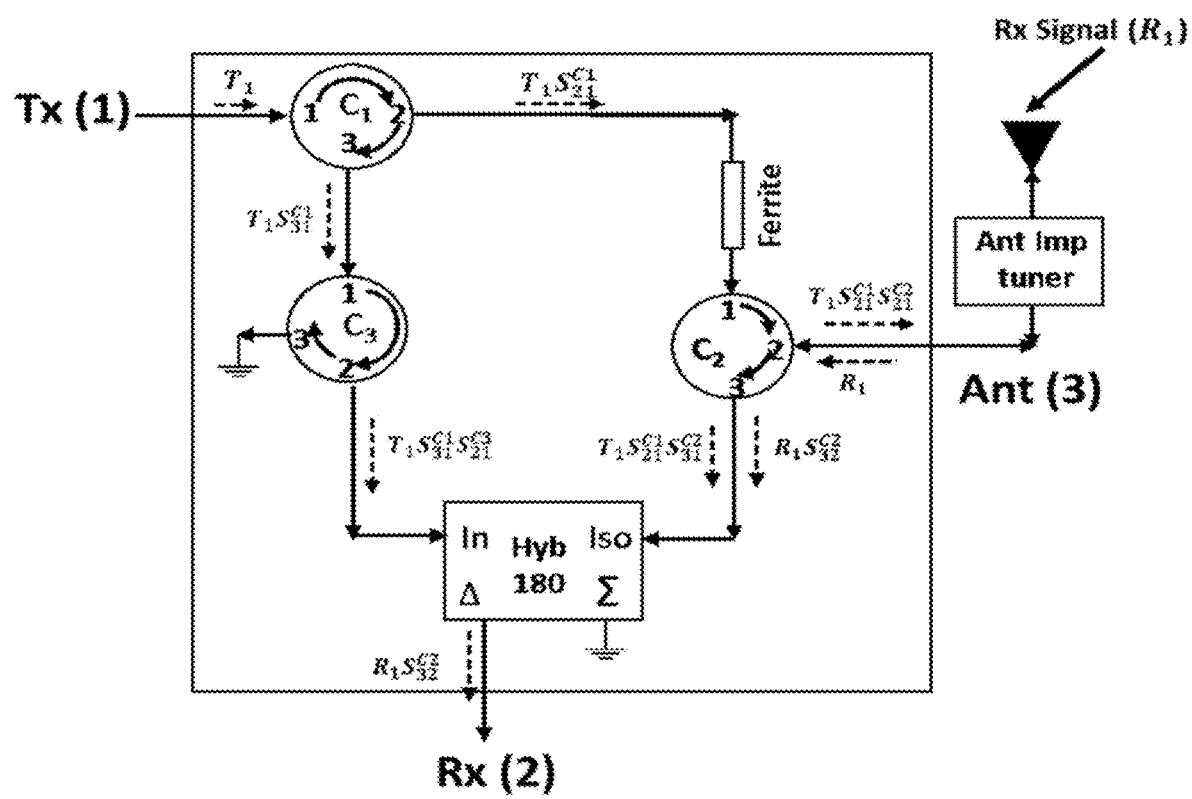
FIG. 6 is a schematic view of a narrowband feed network representation according to an embodiment of the subject invention. An antenna impedance tuner can be included to minimize reflections from the antenna, over a narrowband.
Figure 7:
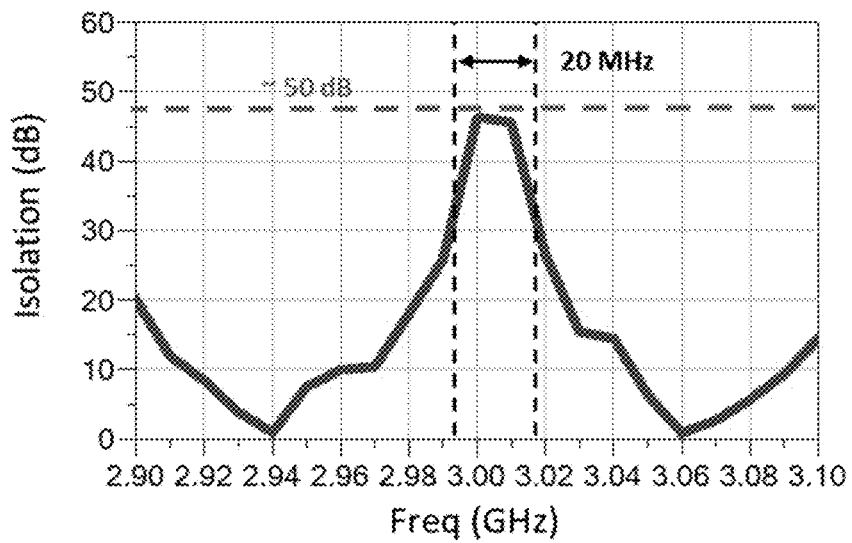
FIG. 7 is a plot showing simulated isolation (in dB) versus frequency (in GHz), depicting radio frequency (RF) cancellation achieved using an impedance tuner with the narrowband feed network of FIG. 6.

FIG. 6 is a schematic view of a narrowband feed network representation according to an embodiment of the subject invention. An antenna impedance tuner can be included to minimize reflections from the antenna. Referring to FIG. 6, at least two additional advantageous components are included compared to related art networks (e.g., the wideband feed network design in U.S. Pat. No. 5,815,803). An antenna impedance tuner can be included to ensure that the antenna is better matched to the transceiver backend, and a ferrite-based mono-directional component (isolator) can be included to ensure that even small reflections are suppressed and are not propagated back to circulator C1. Simulations were run and show that the achieved isolation can be improved to about 50 dB (as shown in FIG. 7), compared to 20 dB for the network of U.S. Pat. No. 5,815,803 (as shown in FIG. 4(a)). The STAR cancellation network was demonstrated for 20 megahertz (MHz) bandwidth. Wideband performance will be considered below.

Wideband Approach

Figure 8:
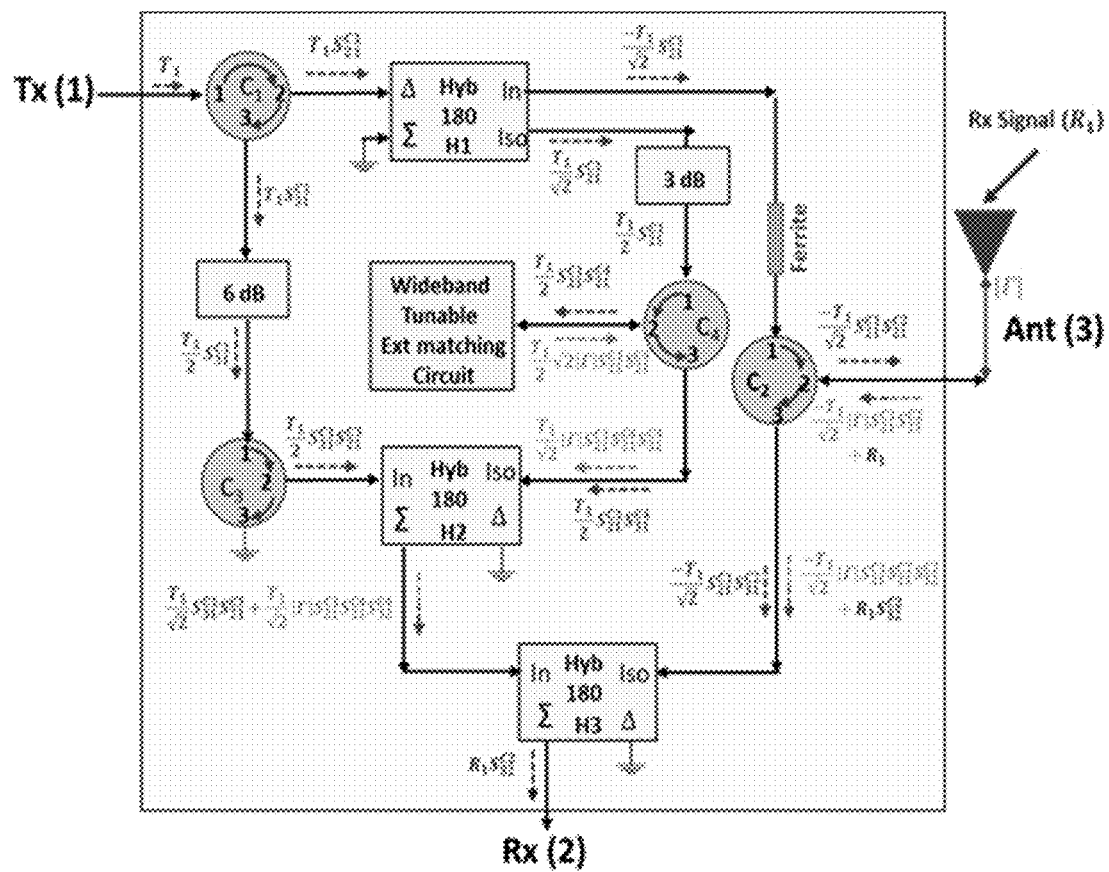
FIG. 8 is a schematic view of a wideband feed network representation according to an embodiment of the subject invention. An external multi-tap matching network can be included to improve STAR cancellation.

FIG. 8 is a schematic view of a wideband feed network representation according to an embodiment of the subject invention. An external multi-tap matching network can be included to cancel out antenna reflections across a wide band and improve STAR cancellation. Referring to FIG. 8, the network can cancel out reflections from the antenna due to impedance mismatches across a wide bandwidth. To do so, the feed network uses multiple circulators and hybrid-180° couplers. For analysis, the signals between ports 1 to 2 and ports 2 to 3 can be denoted as S21 and S31. Also, signals from ports 2 to 1 and ports 3 to 2 can be denoted as S12 and S32. Throughout this analysis, insertion losses (IL) can be assumed to be about 0.5 dB. Also, the circulators can be assumed to have an isolation of 20 dB. Further, [S] parameters of all circulators can be assumed to be the same. For a hybrid-180° coupler, a typical insertion loss of 3 dB can also be assumed. It can further be assumed that there is no phase mismatch at the output ports and that all hybrid-180° couplers behave the same (i.e., [S] parameters of all hybrid-180° couplers are the same). Using the Sij scattering parameters notation, a circuit analysis can be carried out, in particular considering a signal $T_1$ fed as the input (Tx) to the feed network.

The signal $T_1$, after passing through circulator C1 becomes $T_1 S_{21}^{C1}$ and $T_1 S_{32}^{C1}$ at the output of ports 2 and 3 of circulator C1. The output from port 2 is then fed to the Hybrid-180 (H1) whereas the signal from port 3 of C1 is fed to circulator C3 after passing through an attenuator (e.g., a 6 dB attenuator, though embodiments are not necessarily limited thereto). The signal from the hybrid coupler is then fed to the antenna through circulator C2. Consequently, the signal at the antenna port is given by $$\frac{-T_1}{\sqrt{2}} S_{21}^{C1} S_{21}^{C2}.$$

If the antenna is perfectly matched, no part of this signal is reflected back in to the transceiver. However, if the antenna has some mismatch across its operating frequency, as is typically the case, a portion of this signal is reflected back, corresponding to $$\frac{-T_1}{\sqrt{2}} |\Gamma| S_{21}^{C1} S_{21}^{C2},$$

where $\Gamma$ is the reflection coefficient at the antenna port. This is to be cancelled using the signal that passed through circulator C3.

The signal from the hybrid coupler H1, after passing through an attenuator (e.g., a 3 dB attenuator, though embodiments are not necessarily limited thereto) and circulator C4 is given by $$\frac{T_1}{2} S_{21}^{C1} S_{31}^{C4}.$$

This signal is added with the output of circulator 3, corresponding to $$\frac{T_1}{2} S_{31}^{C1} S_{21}^{C3},$$

resulting in a combined signal of $$\frac{T_1}{\sqrt{2}} S_{31}^{C1} S_{21}^{C3}.$$

When the output of the hybrid-180° (H2) is entered into the hybrid H3, the resulting output is, $$R_1 S_{32}^{C2} + \frac{-T_1}{\sqrt{2}} |\Gamma| S_{21}^{C1} S_{21}^{C2} S_{32}^{C2}.$$

This is the net signal from the receive (Rx) port. Notably, the signal reflected from the antenna (Ant) must also be suppressed from returning into the transmitter. This is done using the anisotropic ferrite insertion as depicted in FIG. 8.

To cancel out the mismatched signal value of the hybrid-180° coupler 113 signal, circulator C4 can be introduced and interconnected to a tunable external multi-tap matching network, as shown in FIG. 8. The goal of the circuit is to create an anti-phase signal to completely cancel out the reflected signal from the antenna. The input signal to this circuit from circulator C4 corresponds to $$\frac{T_1}{2} S_{21}^{C1} S_{21}^{C4}.$$

This signal is men modified using the introduced novel matching circuit to generate the signal $$\frac{T_1}{2} \sqrt{2} |\Gamma| S_{21}^{C1} S_{21}^{C4}.$$

When this signal is added to the reflected antenna signal, strong cancellation is ensured.

Figure 9A:
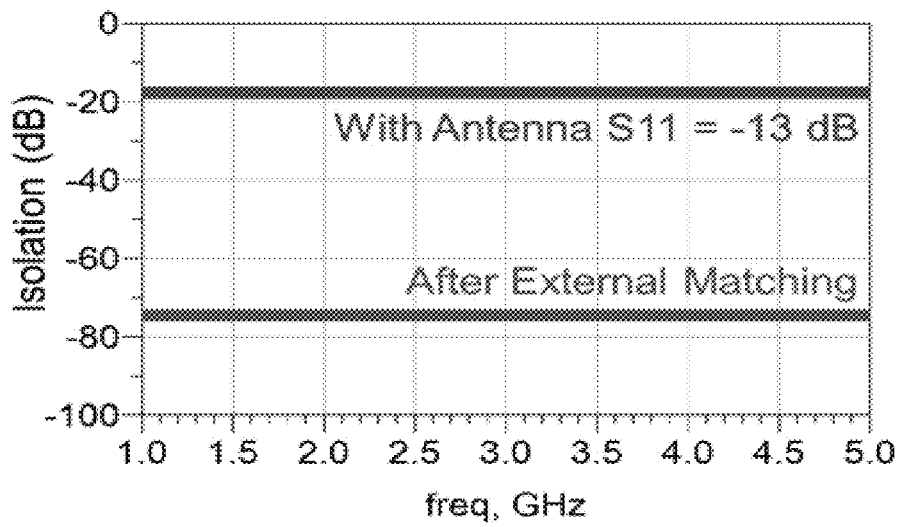
FIG. 9(a) is a plot of simulation isolation (in dB) achieved versus frequency (in GHz), depicting improved isolation due to external matching with the feed network of FIG. 8.
Figure 9B:
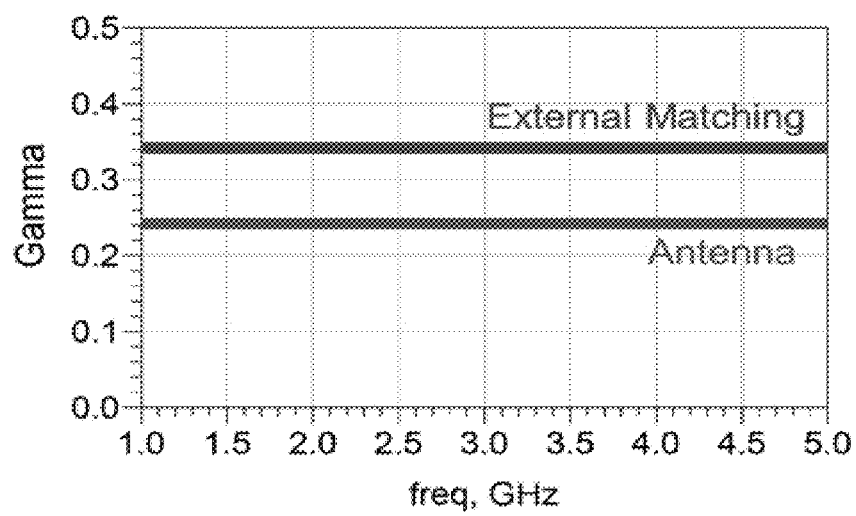
FIG. 9(b) is a plot of reflection coefficient (F) achieved versus frequency (in GHz) at the antenna and the external matching circuit with the feed network of FIG. 8.

The STAR cancellation system of FIG. 8 was simulated with the included wideband tunable external matching circuits, with results shown in FIGS. 9(a) and 9(b). Referring to FIG. 9(a), for an antenna with a Voltage Standing Wave Ratio (VSWR) of 1.6 (S11=−13 dB), the achieved isolation degraded to 20 dB (upper line in FIG. 9(a), without the external matching). However, the new cancellation circuit in FIG. 8 improved the cancellation to 75 dB (lower line in FIG. 9(a)). Proper symmetry of the circulator and hybrid-180° coupler is implied. Referring to FIG. 9(b), the gamma was also improved with external matching (upper line) compared to without (lower line).

Figure 10:
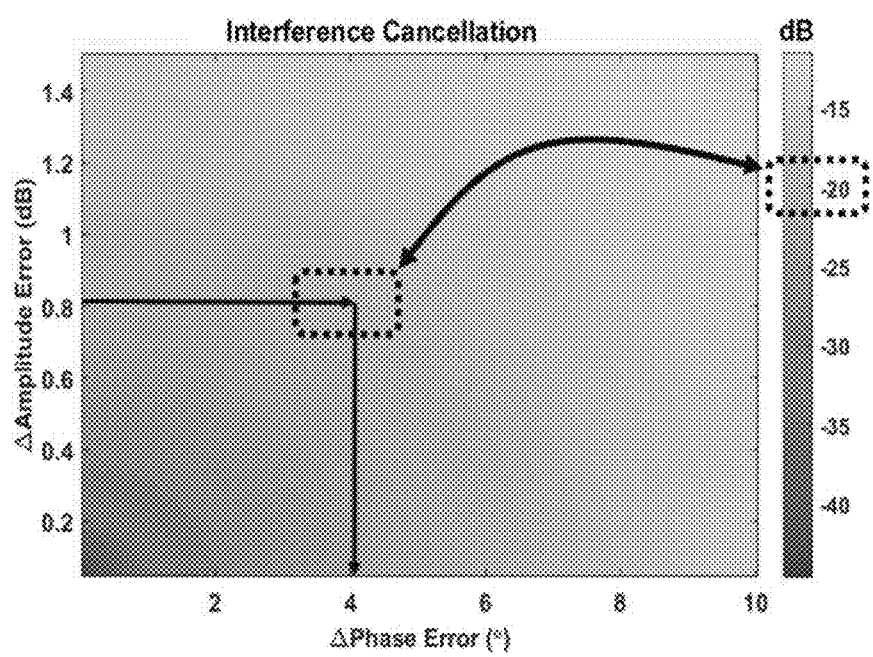
FIG. 10 is a mismatch plot of amplitude error (in dB) versus phase error (in degrees), depicting degradation in achieved interference cancellation.

FIG. 10 is a mismatch plot of amplitude error (in dB) versus phase error (in degrees), depicting degradation in achieved interference cancellation.

Embodiments of the subject invention advantageously allow for simple integration of a novel feed network into any radio system without any modifications. Further, the feed network equally suppresses all parts of the transmit signal including direct signals, the harmonics from the PA, and noise that may be present in the transmit chain. Features of feed networks according to embodiments of the subject invention include: the inclusion of an antenna mismatch tuning circuit; the inclusion of one or more ferrite isolators; and the inclusion of circulators and hybrid-180° couplers. Ferrite isolators can be used to prevent or inhibit the propagation of the return signal back into the transmit chain. An antenna matching circuit (or antenna mismatch tuning circuit) can be used to further reduce the reflected signal back into the feed network. A circulator/hybrid-180° network can create a perfect out-of-phase replica of the transmit signal that needs to be canceled.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

What is claimed is:

1. A feed network to enhance self-interference cancellation, the feed network comprising:
    a first circulator;
    a second circulator connected to the first circulator;
    a third circulator connected to the first circulator;
    a hybrid-180° coupler connected between the second circulator and the third circulator; and
    a ferrite isolator connected between the first circulator and the second circulator.

2. The feed network according to claim 1, a port of the third circulator being terminated with a 50Ω load.

3. The feed network according to claim 1, a sigma port of the hybrid-180° coupler being terminated with a 50Ω load.

4. The feed network according to claim 1, the first circulator being configured to receive an input to the feed network.

5. The feed network according to claim 1, the hybrid-180° coupler being configured to send an output from the feed network.

6. The feed network according to claim 1, the second circulator being configured to receive an input to the feed network and send an output from the feed network.

7. A Simultaneous Transmit and Receive (STAR) system, comprising:
    an antenna;
    a radio transceiver; and
    the feed network according to claim 1 connected between the antenna and the radio transceiver.

8. The STAR system according to claim 7, further comprising an antenna impedance tuner connected between the feed network and the antenna.

9. A feed network to enhance self-interference cancellation, the feed network comprising:
    a first circulator;
    a first hybrid-180° coupler connected to the first circulator;
    a second circulator connected to the first hybrid-180° coupler;
    a third circulator connected to the first circulator;
    a second hybrid-180° coupler connected between the fourth circulator and the third circulator;
    a third hybrid-180° coupler connected between the second hybrid-180° and the second circulator;
    a fourth circulator connected to the first hybrid-180° coupler and the second hybrid-180° coupler; and
    a ferrite isolator connected between the first hybrid-180° coupler and the second circulator.

10. The feed network according to claim 9, further comprising a first attenuator connected between the first circulator and the third circulator.

11. The feed network according to claim 9, further comprising a second attenuator connected between the first hybrid-180° coupler and the fourth circulator.

12. The feed network according to claim 9, further comprising a tunable external multi-tap matching network connected to the fourth circulator.

13. The feed network according to claim 9, a port the third circulator being terminated with a 50Ω load.

14. The feed network according to claim 9, a sigma port of the first hybrid-180° coupler being terminated with a first 50Ω load,
    a delta port of the second hybrid-180° coupler being terminated with a second 50Ω load, and
    a delta port of the third hybrid-180° coupler being terminated with a third 50Ω load.

15. The feed network according to claim 9, the first circulator being configured to receive an input to the feed network.

16. The feed network according to claim 9, the third hybrid-180° coupler being configured to send an output from the feed network.

17. The feed network according to claim 9, the second circulator being configured to receive an input to the feed network and send an output from the feed network.

18. A Simultaneous Transmit and Receive (STAR) system, comprising:
    an antenna;
    a radio transceiver; and
    the feed network according to claim 9 connected between the antenna and the radio transceiver.

19. The STAR system according to claim 18, further comprising an antenna impedance tuner connected between the feed network and the antenna.

20. A Simultaneous Transmit and Receive (STAR) system, comprising:
    an antenna;

a radio transceiver; and
a feed network connected between the antenna and the radio transceiver,
the feed network comprising:
  a first circulator;
  a first hybrid-180° coupler connected to the first circulator;
  a second circulator connected to the first hybrid-180° coupler;
  a third circulator connected to the first circulator;
  a second hybrid-180° coupler connected between the fourth circulator and the third circulator;
  a third hybrid-180° coupler connected between the second hybrid-180° and the second circulator;
  a fourth circulator connected to the first hybrid-180° coupler and the second hybrid-180° coupler;
  a ferrite isolator connected between the first hybrid-180° coupler and the second circulator;
  a first attenuator connected between the first circulator and the third circulator;
  a second attenuator connected between the first hybrid-180° coupler and the fourth circulator; and
  a tunable external multi-tap matching network connected to the fourth circulator,
a port of the third circulator being terminated with a first 50Ω load,
a sigma port of the first hybrid-180° coupler being terminated with a second 50Ω load,
a delta port of the second hybrid-180° coupler being terminated with a third 50Ω load,
a delta port of the third hybrid-180° coupler being terminated with a fourth 50Ω load,
the first circulator being configured to receive a first input to the feed network from the radio transceiver,
the third hybrid-180° coupler being configured to send a first output from the feed network to the radio transceiver, and
the second circulator being configured to receive a second input to the feed network from the antenna and to send a second output from the feed network to the antenna.

\* \* \* \* \*